United States Patent
Yoshida

(10) Patent No.: US 6,982,805 B2
(45) Date of Patent: Jan. 3, 2006

(54) FACSIMILE APPARATUS, METHOD FOR CONTROLLING FACSIMILE APPARATUS AND COMPUTER-READABLE STORING MEDIUM STORING CONTROL PROGRAM FOR FACSIMILE APPARATUS

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 937 days.

(21) Appl. No.: 10/020,876

(22) Filed: Dec. 19, 2001

(65) Prior Publication Data

US 2002/0075518 A1    Jun. 20, 2002

(30) Foreign Application Priority Data

Dec. 20, 2000  (JP)  ............................ 2000-386812
Dec. 3, 2001   (JP)  ............................ 2001-368046

(51) Int. Cl.
  G06F 15/00   (2006.01)
  H04N 1/00    (2006.01)
  H04N 1/46    (2006.01)

(52) U.S. Cl. .................... 358/1.15; 358/400; 358/401; 358/404; 358/500

(58) Field of Classification Search ............... 358/1.15, 358/400, 401, 404, 500, 296, 1.16
See application file for complete search history.

(56) References Cited

U.S. PATENT DOCUMENTS

| | | | |
|---|---|---|---|
| 4,805,013 A | 2/1989 | Dei et al. ...................... 358/80 |
| 5,086,487 A | 2/1992 | Katayama et al. ............. 382/56 |
| 5,138,672 A | 8/1992 | Hirabayashi et al. ......... 382/54 |
| 5,159,468 A | 10/1992 | Yoshida et al. ............. 358/451 |
| 5,241,397 A * | 8/1993 | Yamada ...................... 358/296 |
| 5,638,192 A | 6/1997 | Yoshida ...................... 358/530 |
| 5,734,760 A | 3/1998 | Yoshida ...................... 382/296 |
| 5,774,231 A | 6/1998 | Yoshida ...................... 358/434 |
| 5,889,594 A * | 3/1999 | Maekawa ................... 358/296 |
| 5,898,764 A | 4/1999 | Yoshida ................. 379/100.17 |
| 5,943,449 A | 8/1999 | Yoshida ...................... 382/296 |
| 5,956,425 A | 9/1999 | Yoshida ...................... 382/234 |
| 5,987,300 A | 11/1999 | Mori ......................... 399/401 |
| 6,008,913 A | 12/1999 | Yoshida ...................... 358/529 |
| 6,052,201 A * | 4/2000 | Shibaki et al. ............. 358/1.16 |
| 6,178,005 B1 | 1/2001 | Yoshida ...................... 358/1.18 |
| 6,266,128 B1 | 7/2001 | Yoshida et al. ............... 355/40 |
| 6,285,465 B1 | 9/2001 | Yoshida ...................... 358/434 |

FOREIGN PATENT DOCUMENTS

| | | |
|---|---|---|
| JP | 8-223351 | 8/1996 |
| JP | 10-339975 | 12/1998 |

* cited by examiner

*Primary Examiner*—Kimberly Williams
*Assistant Examiner*—Charlotte M. Baker
(74) *Attorney, Agent, or Firm*—Fitzpatrick, Cella, Harper & Scinto

(57) ABSTRACT

The present invention aims to effectively utilize a memory by changing a recording system for received images in accordance with a remaining amount of the memory. When images received by a facsimile are printed, in accordance with the memory remaining amount, images are read out from storing means and are recorded by recording means in such a manner that, after a predetermined number of one sides of recording media are successively recorded, the recording medium is directed into a recording medium reverse-rotating mechanism, and one side of another recording medium until the recording medium is picked up from the reverse-rotating mechanism and is recorded so as to record the other side of the recording medium. Further, in accordance with the memory remaining amount, front and back sides of the recording medium can be read out and recorded alternately, or only one sides of the recording media can be recorded.

12 Claims, 13 Drawing Sheets

FIG. 2

| BIT NO. | DIS/DTC | DCS |
|---|---|---|
| X | PRESENCE/ABSENCE OF BOTH-SIDE RECORD FUNCTION (ALTERNATE MODE) | BOTH-SIDE TRANSMISSION (ALTERNATE MODE) |
| X+1 | PRESENCE/ABSENCE OF BOTH-SIDE RECORD FUNCTION (CONTINUOUS MODE) | BOTH-SIDE TRANSMISSION (CONTINUOUS MODE) |

FIG. 3

| FLAG | ADDRESS | CONTROL | FCF | PC | BC | FC | LENGTH | PAGE NUMBER | PAGE INFORMATION | FCS | FLAG |

FOR ECM

ALTERNATE MODE
(NORMAL G3)

FIG. 12

BOTH-SIDE RECEPTION

| PHYSICAL PAGE COUNTER | 1 | | 2 | | 3 | | ... |
|---|---|---|---|---|---|---|---|
| | F | B | F | B | F | B | ... |
| DECODING/RECORDING ORDER | ③ | ① | ⑤ | ② | ⑥ | ④ | ... |

FIG. 13

COMPULSORY BOTH-SIDE RECEPTION

| PHYSICAL PAGE COUNTER | 1 | 2 | 3 | 4 | 5 | 6 | ... |
|---|---|---|---|---|---|---|---|
| | F | B | F | B | F | B | ... |
| DECODING/RECORDING ORDER | ③ | ① | ⑤ | ② | ⑥ | ④ | ... |

FACSIMILE APPARATUS, METHOD FOR CONTROLLING FACSIMILE APPARATUS AND COMPUTER-READABLE STORING MEDIUM STORING CONTROL PROGRAM FOR FACSIMILE APPARATUS

BACKGROUND OF THE INVENTION

1. Field of the Invention

The present invention relates to a facsimile apparatus for receiving and decoding image data and for outputting both-side record data, a method for controlling such a facsimile apparatus, and a computer-readable storing medium storing a control program for such a facsimile apparatus.

2. Related Background Art

In conventional facsimile apparatuses, a fundamental operation was to send one-side information of an original and to effect one-side recording. In conventional ITU-T Recommendation T4, T30 or the like, only one-side communication was described.

On the other hand, recently, interest regarding the saving of resources has been increased, and, in printers, copiers and the like, use of a both-side recording system capable of recording image on both front and back sides of a single paper has been increased. Attending to this, the standard regarding the both-side facsimile communication was recommended in ITU-T on February, 2000. In the ITU-T Recommendation, presence/absence of a receiving function for both-side information is noticed from a receiver to a transmitter and the fact whether or not the both-side communication is effected is noticed from the transmitter to the receiver.

Further, as transferring systems for the both-side image communication, both-side alternate transferring (alternate mode) in which an image on a front side of an original and an image on a back side of the original are alternately transmitted for each page and a both-side continuous transferring (continuous mode) in which all the images on the front sides of the original are firstly transmitted and then are the images on the back sides are transmitted are known.

When the both-side communication according to the present ITU-T Recommendation is carried out, an indispensable function is the both-side alternate transferring (alternate mode) in which the image on the front side of the original and the image on the back side of the original are alternately transmitted for each page.

On the other hand, as a record outputting order of a both-side-received image, for convenience's sake for the user, so-called face-down output in which the back side is firstly recorded and then the front side is recorded and the output is effected is considered.

However, in the system in which the back side and the front side are alternately printed, in case of both-side recording, a recording paper reverse-rotating (turn over) mechanism is required and a recording speed is normally slower than the one-side recording so that, when decoding and record outputting are merely effected in order of back side of a first page, front side of the same, back side of a second page, front side of the same and the like, since a processing time for reverse rotation of the recording paper is always required for each page, there arises a problem that the printing speed of the printer cannot be maximized during the both-side recording. Further, this causes bottle-neck which leads is a problem that picking-up of data from a received image memory is delayed and an image memory for buffering the received image must be provided additionally.

Further, in order to always maximize the printing speed of the printer, an area therefor must always be reserved, which also requires an additional memory.

SUMMARY OF THE INVENTION

An object of the present invention is to permit a printing speed of a printer to be made maximum.

Another object of the present invention is to control decoding and recording processes without wasting a memory and to permit recording of received data in proper recording and discharging orders.

A further object of the present invention is to effectively utilize a memory flexibly to other applications such as transmission and printer for user's convenience by effecting optimum recording in accordance with a memory remaining amount.

To achieve the above objects, according to a first aspect of the present invention, in a facsimile apparatus for receiving and decoding image data and effecting both-side record output, a method for controlling such a facsimile apparatus and a computer-readable storing medium storing a control program for such a facsimile apparatus, there is provided an arrangement in which, when both-side recording is effected by using a reverse-rotating mechanism, it-is judged whether a memory remaining amount is greater than a predetermined amount, and, if the memory remaining amount is greater than the predetermined amount, after recording is effected on one side of a preceding recording paper, the recording paper is directed to the recording paper reverse-rotating mechanism, and one side of a succeeding recording paper is recorded until the preceding recording paper is picked up from the reverse-rotation mechanism and recording on the other side thereof is effected.

According to a second aspect of the present invention, there is provided an arrangement in which, if the memory remaining amount is smaller than the predetermined amount, after an image is read out from accumulating means and the recording is effected on one side of a preceding recording paper, the recording paper is directed to the recording paper reverse-rotating mechanism, and recording is effected on the other side of the preceding recording paper without effecting recording on one-side of a succeeding recording paper until the preceding recording paper is picked up from the reverse-rotation mechanism and recording on the other side thereof is effected.

According to a third aspect of the present invention, there is provided an arrangement in which it is judged whether a memory remaining amount is greater than a predetermined amount, and, if the memory remaining amount is below the predetermined amount, recording on only one side of a recording paper is effected.

According to a fourth aspect of the present invention, there is provided an arrangement in which it is judged whether a memory remaining amount is smaller than a first predetermined amount and smaller than a second predetermined amount smaller than the first predetermined amount, and, if the memory remaining amount is greater than the first predetermined amount, after recording is effected on one side of a preceding recording paper, the recording paper is directed to the recording paper reverse-rotating mechanism, and one side of a succeeding recording paper is recorded until the preceding recording paper is picked up from the reverse-rotation mechanism and recording on the other side thereof is effected, and, if the memory remaining amount is greater than the second predetermined amount and smaller than the first predetermined amount, after the recording is effected on one side of the preceding recording paper, the recording paper is directed to the recording paper reverse-rotating mechanism, and recording is effected on the other side of the preceding recording paper without effecting recording on one-side of a succeeding recording paper until the preceding recording paper is picked up from the reverse-rotation mechanism and recording on the other side thereof is effected, and, if the memory remaining amount is below the predetermined amounts, recording on only one side of the recording paper is effected.

BRIEF DESCRIPTION OF THE DRAWINGS

FIG. 2 is a table showing FIF of DIS/DTC and DCS signals used in both-side transferring;

FIG. 3 is an explanatory view showing a format of a post-message signal used in the both-side transferring;

FIG. 12 is an explanatory view showing a process in reception according to the present invention;

FIG. 13 is an explanatory view showing a process in compulsory both-side reception of one-side information according to the present invention;

DESCRIPTION OF THE PREFERRED EMBODIMENTS

The present invention will now be explained in connection with embodiments thereof with reference to the accompanying drawings.

Figure 1:
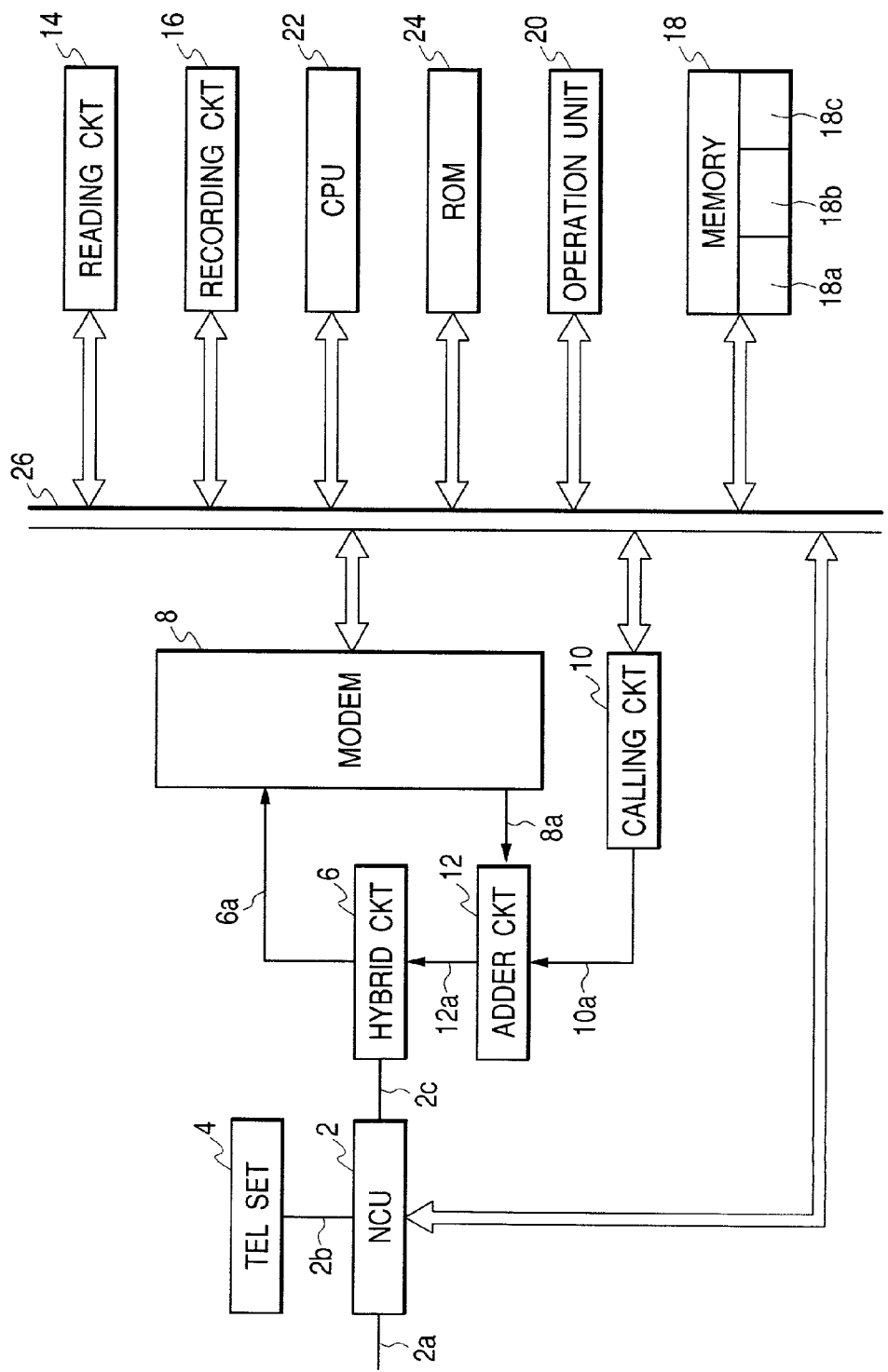
FIG. 1 is a block diagram showing a hardware construction of a facsimile apparatus to which the present invention is applied.

FIG. 1 shows a hardware construction of a facsimile apparatus to which the present invention is applied. In FIG. 1, an NCU (network controlling unit) 2 is connected to a terminal of a telephone line to use a telephone network for data communication and the like and serves to effect connection control of a telephone exchange network and to effect switching to a data communication path and to holding a loop. The NCU 2 also serves to connect a telephone line 2a to a telephone set 4 (CML OFF) or to connect the telephone line 2a to the facsimile apparatus (CML ON) in accordance with control from a bus 26. In a normal condition, the telephone line 2a is connected to the telephone set 4.

A hybrid circuit 6 serves to separate a signal of a transmission system from a signal of a reception system, to send a transmission signal from an adder circuit 12 to the telephone line 2a through the NCU 2, to receive a recipient signal through the NCU 2 and to send the signal to a MODEM 8 through a signal line 6a.

The MODEM 8 serves to perform modulation and demodulation on the basis of V.8, V.21, V.27ter, V.29, V.17 and V.34 in ITU-T Recommendation, and a transfer mode is designated in the MODEM under the control of the bus 26. The MODEM 8 receives a transmission signal from the bus 26, and outputs modulated data to a signal line 8a, and also receives a reception signal outputted to the signal line 6a and outputs demodulated data to the bus 26.

A calling circuit 10 serves to receive telephone number information and to output a selection signal of DTMF type to a signal line 10a in accordance with control from the bus 26.

The adder circuit 12 serves to receive information on the signal line 8a and information on the signal line 10a and to output an added result to a signal line 12a.

A reading circuit 14 can read both-side information and serves to output the read data to the bus 26.

A recording circuit 16 can record the both-side information and serves to successively record the informations outputted to the bus 26 every one-line. In the illustrated embodiment, the recording circuit 16 is constituted by a recording mechanism such as a laser beam printer having a recording paper reverse-rotating mechanism. The recording paper reverse-rotating mechanism of the recording circuit 16 is configured so that a plurality of recording papers (two recording papers in the following example; but not limited to two) are contained and reverse-rotated (turned over) at once.

Figure 14:
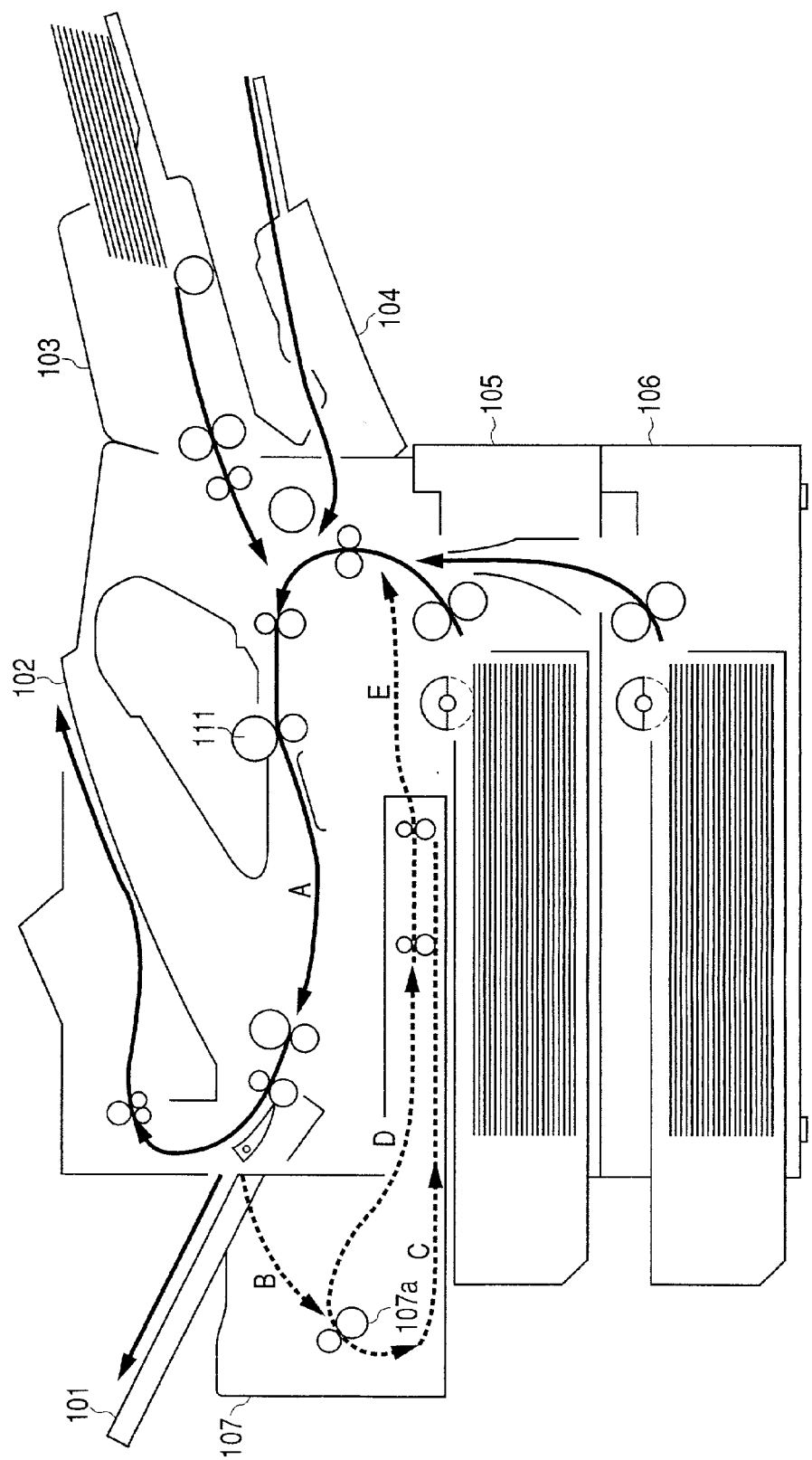
FIG. 14 is an explanatory view showing an example of a construction of a recording circuit of FIG. 1.

FIG. 14 shows an example of a construction of the recording circuit 16. In the illustrated example, the recording circuit 16 is constituted by a recording mechanism such as a laser beam printer having a recording paper reverse-rotating mechanism. As will be described later, the recording paper reverse-rotating mechanism of the recording circuit 16 is configured so that a plurality of recording papers (two recording papers in the following example; but not limited to two) are contained and reverse-rotated (turned over) at once.

In the example shown in FIG. 14, the recording paper is supplied from a cassette 105 or 106 situated at a lower part of the mechanism or from a post card feeder 103 or a manual insertion feeder 104 and recording is effected on the recording paper by a photosensitive drum 111 (or an appropriate recording head in any system other than the laser beam system).

In FIG. 14, a discharge port is provided with a face-up tray 101 and a face-down tray 102. In case of a system in which recording on a back side is firstly effected, with which the present invention is associated, the recording paper is discharged onto the face-down tray 102.

In case of both-side recording, the recording on a back side of a first page is effected by the photosensitive drum 111, and the recording paper is conveyed into a reverse-rotating mechanism 107 through conveying paths A and B. Then, after the recording paper is once conveyed into a conveying path C by a reverse-rotating roller 107a, the recording paper is conveyed into a conveying path D from a trailing end of the paper, thereby achieving a waiting condition in which a reverse-rotated condition permitting recording on a front side is maintained. During the reverse-rotation, recording on a back side of a second page can be effected, and, after the back side of the second page is finished, when the conveying path A is emptied, the waiting first page recording paper is conveyed into the conveying path A and the recording on the front side of the first page is effected, and at the same time, the second page recording paper is turned over (reverse-rotated) in the conveying paths C, D to be brought to a waiting condition. The first page in which the front and back sides were recorded is discharged onto the face-down tray 102, and then, a back side of a third page is recorded, and, thereafter, the front side of the second page is recorded.

Although a further recording process is the same as the above, in case of recording for n pages, in the arrangement in which two recording papers are held in the conveying paths, a recording order becomes as follows:

back side of first page, back side of second page, front side of first page, back side of third page, front side of second page, back side of fourth page, ... back side of n page, front side of n−1 page, (back side of n+1 page ... )

A memory circuit 18 includes a read/write memory (RAM) having the following area allotted.

First of all, the reference numeral 18a denotes a received image memory area for storing received compressed image data. As a compressing system for the image data, for example, in case of G3 type, normally, a compressing system such as MH or MR is used.

The reference numeral 18b denotes a work area used by a CPU 22 for coding/decoding the image data.

The reference numeral 18c denotes a bit map memory area for storing bit map data as decoded (which may have a type which can be inputted to the recording circuit 16 directly or other intermediate data type. Namely, data obtained by decoding facsimile compression data).

An operation unit 20 includes a one-touch dial, reduction dial, ten-key, * key, # key, start key, stop key, set key, both-side transmission selection key and other function keys. Information regarding the depressed key is outputted to the bus 26. Further, the operation unit 20 includes a display unit comprised of displaying elements such as LCDs or LEDs serving to input and display the information being outputted to the bus 26.

The CPU (central processing unit) 22 serves to control the operation of the entire facsimile apparatus and to execute facsimile transmission controlling procedure, and a control program for the procedure is stored in a ROM 24. Further, in the illustrated embodiment, the CPU 22 performs coding and decoding of the transmission/reception image data, but, an encoder/decoder comprising other hardware may be used for actually performing such coding/decoding. The bus 26 of the CPU 22 is constituted by address bus or data bus.

Now, general procedure for both-side transferring will be briefly described with reference to FIGS. 2 to 7.

As communication modes for the both-side transferring, there are two mode, i.e., an alternate mode (both-side alternate transferring mode) and a continuous mode (both-side continuous transferring mode). The alternate mode is a mode in which a front side and a back side of each original (for example, a front side and back side of a first page, a front side and back side of a second page, ... ) are alternately transferred. The continuous mode is a mode in which front sides of originals (for example, a front side of a first page, a front side of a second page, ... ) are firstly transferred and then back side of the originals (for example, a back side of the first page, a back side of the second page ... ) are transferred in the page order. The facsimile apparatus can utilize either of such modes in accordance with its mounting condition.

FIG. 2 is a table showing informations designating the both-side transferring in FIF (facsimile information field) of signals regarding DIS (digital identification signal: transmitted from an image receiving station), DTC (digital transmission command: transmitted from an image transmitting station) and DCS (digital command signal: transmitted from the image transmitting station).

As shown in FIG. 2, in the DIS/DTC signals, presence/absence of a both-side record function in the alternate mode is represented by x-th bit (although the bit number is shown by "x" in the table, actually, bit 113) of FIF and presence/absence of a both-side record function in the continuous mode is represented by (n+1)-th bit (bit 114) of FIF. Further, in the DCS signal, both-side transmission in the alternate mode is designated by x(113)-th bit of FIF and both-side transmission in the continuous mode is designated by (x+1)(114)-th bit of FIF.

Incidentally, in the following description, the bits designating the both-side record function and the both-side communication mode are represented by bit x and bit (x+1).

FIG. 3 shows a frame arrangement of a Q signal in normal G3 transferring (concretely, EOP (end of page) signal, MPS (multi page) signal or EOM (end of message) signal) or PPS-Q signal in ECM (error correction mode) transferring (concretely, post-message signal such as PPS-EOP, PPS-MPS, PPS-EOM or PPS-NULL signal).

As shown in FIG. 3, in such post-message signals, following to Flag (flag), Address (address), Control (control data) and FCF (facsimile control field), facsimile informations are transmitted. For ECM, three fields, i.e., PC (page counter), BC (block counter) and FC (frame counter) are transmitted, and, thereafter, facsimile informations associated with the both-side transferring follow. The facsimile informations associated with the both-side transferring include Length (length: data size of page (unit: octet number): data width of this field is 1 octet), Page Number (page number: 2 octets), Page Information (page information), FCS (frame check sequence), and Flag (flag).

Among them, regarding the Page Number (page number), for rules, when the front and back sides of the originals are transmitted in the page order, one page is added to P1 for each front or back side. Further, regarding the Page Information (page information), the fact whether image information is on the front side or the back side is shown by 1 octet data width so that the front side is represented by "0" and the back side is represented by "1" by using bit 0. Presently, bit 1 to bit 6 are reserved bits and functions thereof are not defined. A bit 7 is always set to "0" as an expansion bit.

Among the facsimile information of the post-message signals, three fields, i.e., Length, Page Number and Page Information are newly added fields for the both-side transferring.

Incidentally, the Q-signals used in the normal G3 communication do not include PC, BC and FC which are only used in PPS-Q signal in the ECM communication.

Figure 4:
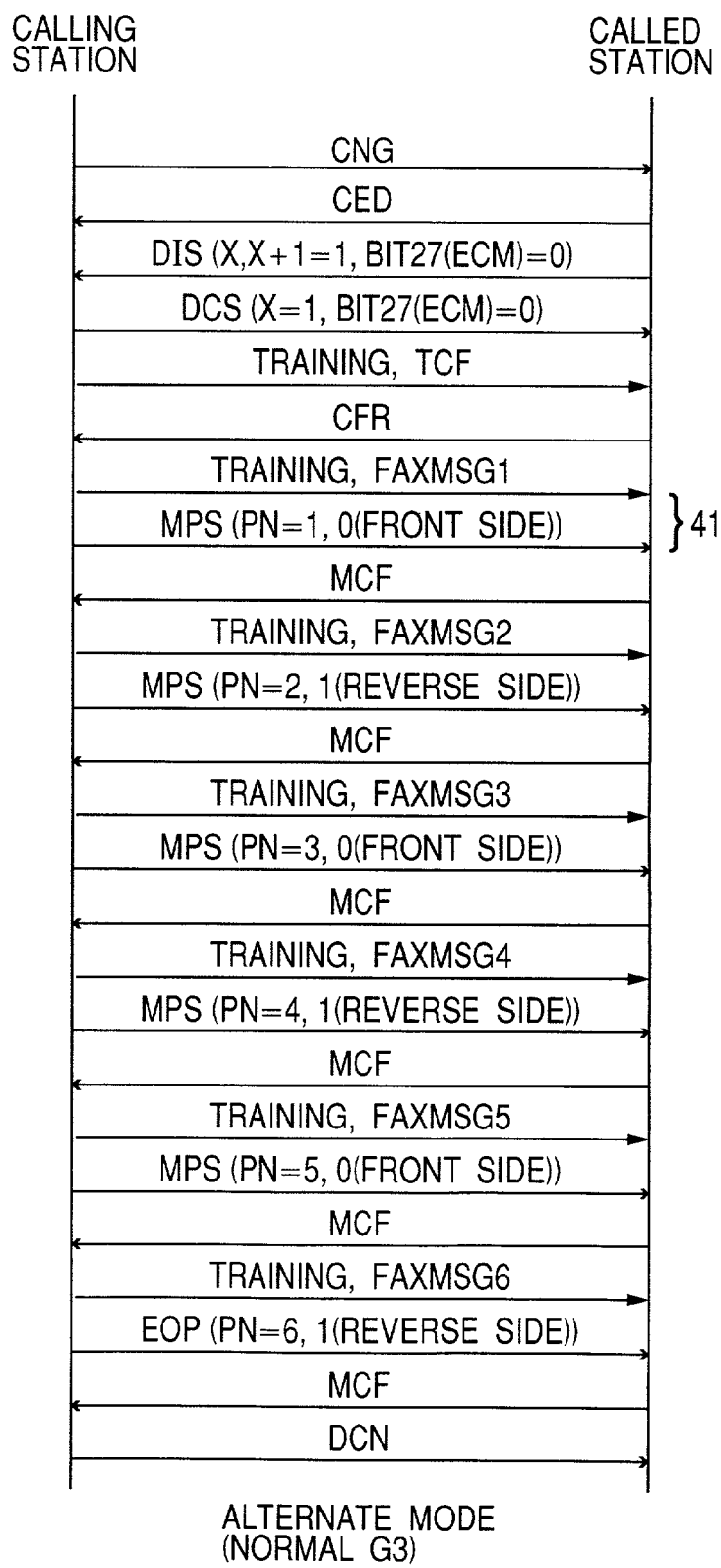
FIG. 4 is an explanatory view showing the both-side transmission in an alternate mode in a non-ECM communication mode.
Figure 5:
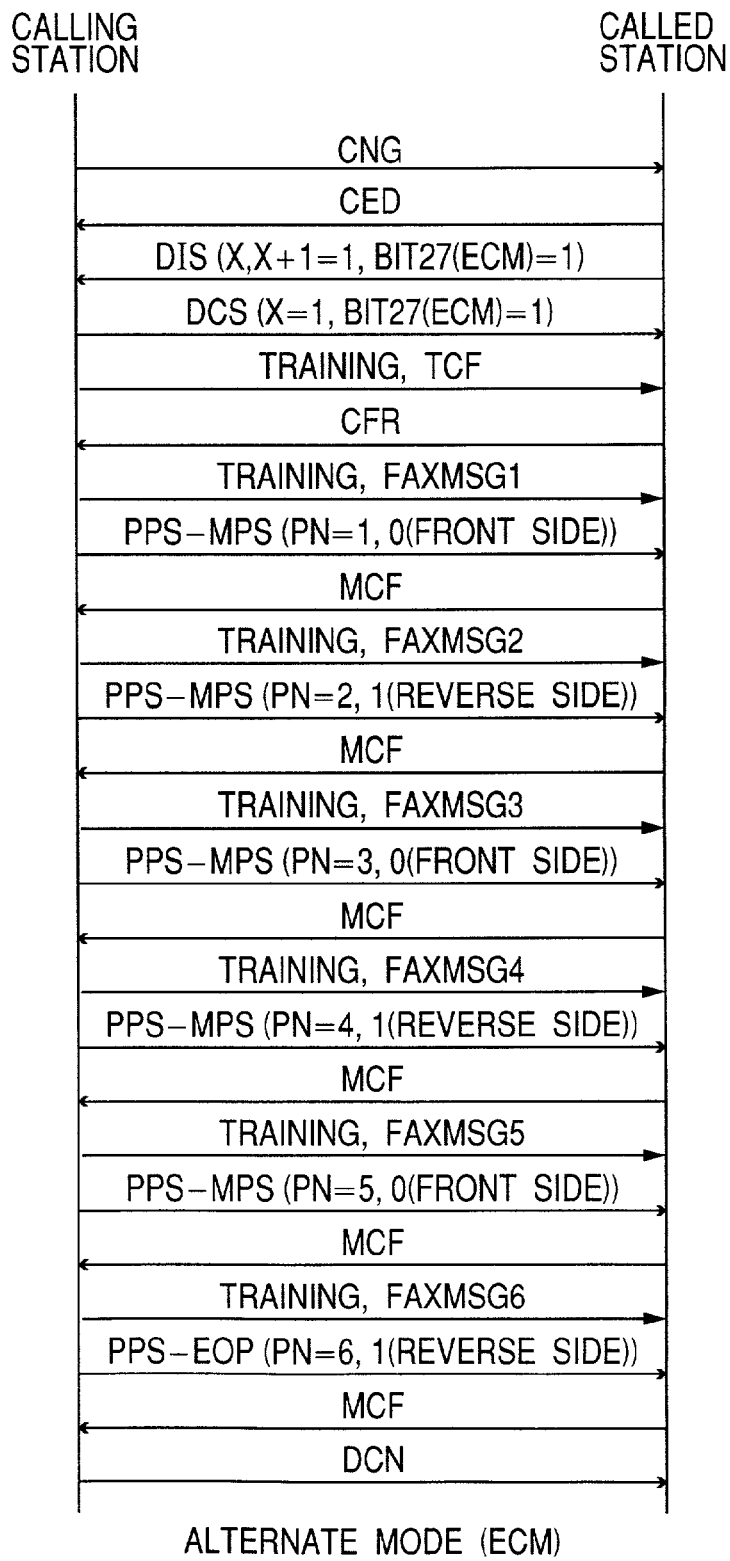
FIG. 5 is an explanatory view showing the both-side transmission in an alternate mode in an ECM communication mode.
Figure 6:
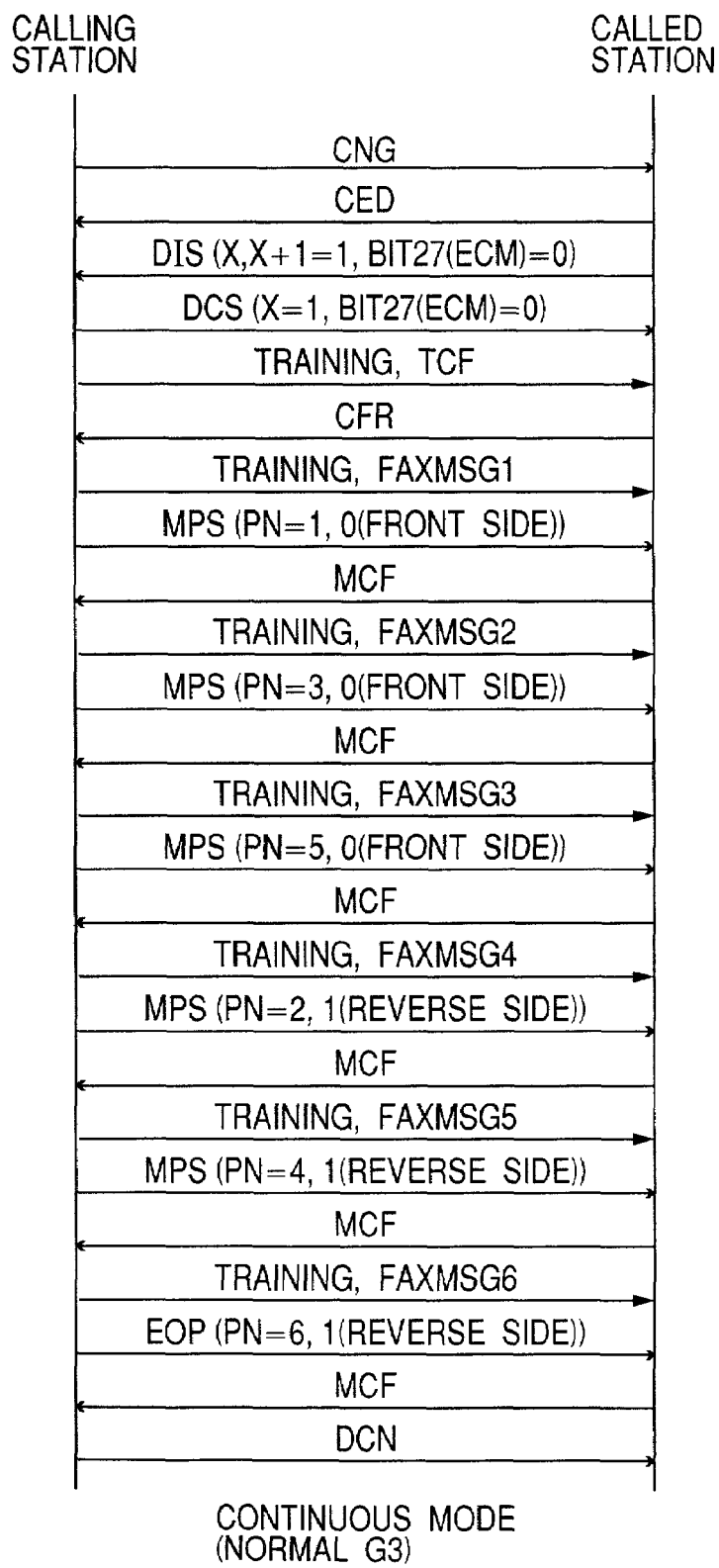
FIG. 6 is an explanatory view showing the both-side transmission in a continuous mode in a non-ECM communication mode.
Figure 7:
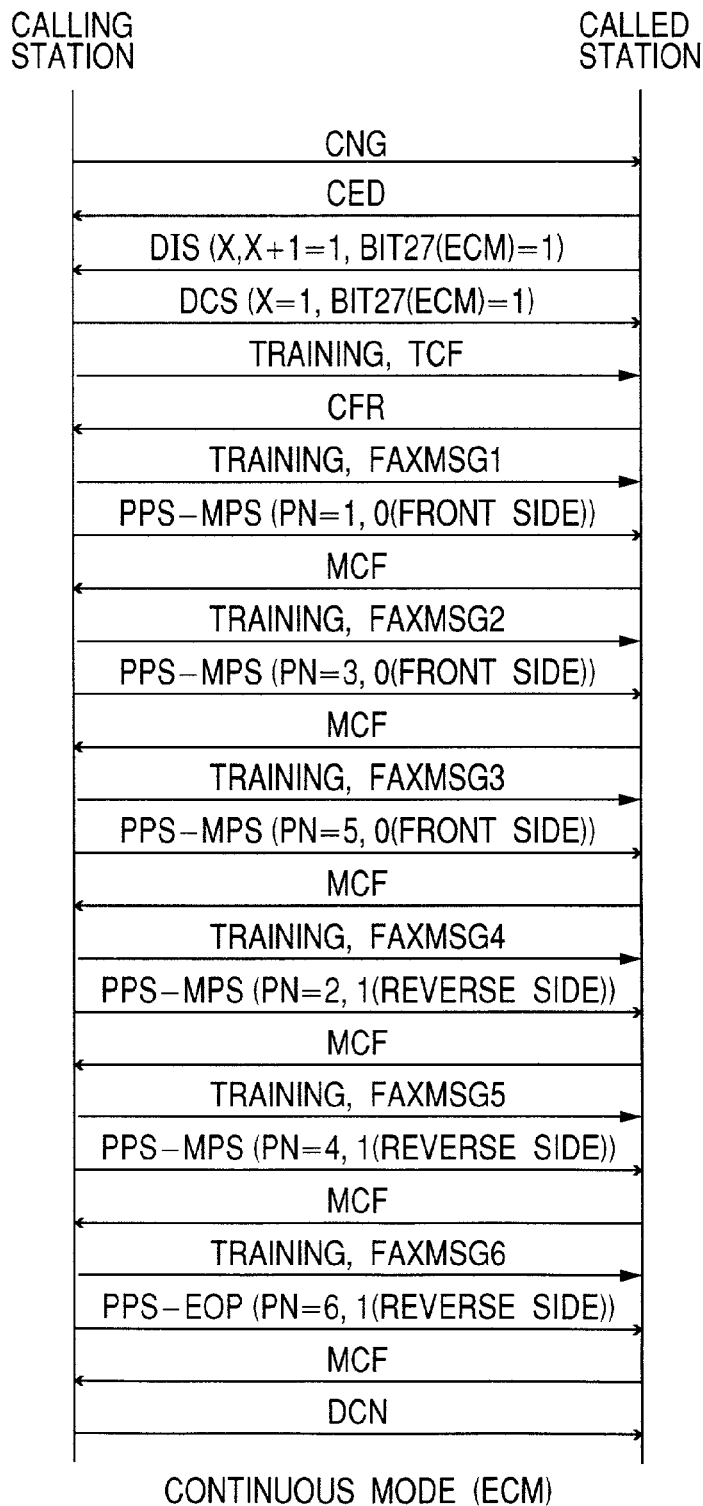
FIG. 7 is an explanatory view showing the both-side transmission in a continuous mode in an ECM communication mode.

FIG. 4 shows the both-side transferring in the alternate mode in the normal G3 mode, FIG. 5 shows the both-side transferring in the alternate mode in the ECM communication mode, FIG. 6 shows the both-side transferring in the continuous mode in the normal G3 mode, and FIG. 7 shows the both-side transferring in the continuous mode in the ECM communication mode.

As shown in FIGS. 4 to 7, the both-side transferring function (in the alternate mode or continuous mode) of the receiver is shown by bit x and bit x+1 of the DIS signal, and the both-side transferring mode which is to be executed by the transmitter from now is declared by bit x and bit x+1 of the DCS signal. In the continuous modes shown in FIGS. 6 and 7, by setting bit x+1 of DCS signal to "1", the fact that the transmission in the continuous mode is performed is declared.

Further, as shown in FIGS. 4 and 6, in case of the normal mode, the MPS signal is used as the post-message signal, and, as shown in FIGS. 5 and 7, in case of ECM, the PPS-MPS signal is used as the post-message signal.

Here, three both-side originals are transmitted, and, in FIGS. 4 to 7, "PN" represents Page Number.

For example, the MPS signal denoted by the reference numeral 41 in FIG. 4 (alternate mode) is shown as "MPS (PN=1, 0 (front side))", and this means the fact that the image information on the front side (0 (front side)) having page number 1 (PN=1) was transmitted (representation of MPS signal or PPS-MPS signal in FIGS. 5 to 7 is the same as the above).

That is to say, in the alternate modes shown in FIGS. 4 and 5, the image information of the originals are transmitted in order of front side (0) of first original (PN=1), back side (1) of first original (PN =2), front side (0) of second original (PN=3), back side (1) of second original (PN=4), front side (0) of third original sheet (PN=5) and back side (1) of third original sheet (PN=6).

Further, in the continuous modes shown in FIGS. 6 and 7, the image information of the originals are transmitted in order of front side (0) of first original (PN=1), front side (0) of second original (PN=3), front side (0) of third original (PN=5), back side (1) of first original (PN=2), back side (1) of second original (PN=4) and back side (1) of third original (PN=6).

Although the above-mentioned procedure is general both-side receiving procedure, in the illustrated embodiment, the following communication control is effected by the CPU 22. Such control procedure is stored in the ROM 24 as the program for the CPU 22.

That is to say, in the illustrated embodiment, upon reception of both-side image information and one-sided information, the order of decoding processes effected to record the received images is changed or altered to page order suitable for record control of the recording circuit 16 (regardless of receiving order).

The fact that the order of the decoding processes is changed to the order different from the receiving order has two meanings. One is to reduce the capacity of the bit map memory (18c) requested when the page order is applied to the recording in order to realize the face-down output. The other is to enhance through-put of the recording circuit 16 and to reduce the time period during which the bit map data remains in the bit map memory (18c), by producing the bit map data in order suitable for the both-side recording process of the recording circuit 16.

Further, there is provided a compulsory both-side reception made for effecting compulsory both-side recording of one-side information received in one-side protocol. In both-side recording in the compulsory both-side reception mode, after the attribution of front and back sides is determined in the receiving order of one-side information received in the one-side protocol, page processing order of decoding effected during the both-side recording is changed.

Further, upon reception of the both-side image, a reception error is checked by using frame check sequence information.

The fact (EMC procedure) that the received information error is detected by the frame check sequence when the decoding processing order is changed has the following meaning. Namely, although the received information is stored in the received image memory 18a as compression data such as MR/MMR until the decoding is performed, if the information is received and stored in the memory without error check, presence/absence of the error cannot be detected until the received data is actually decoded. That is to say, the error check is effected by using the frame check sequence, and, if there is the error, after the retransmission is performed on the basis of the ECM procedure, by storing the information in the received image memory 18a, the image data can be received positively, and the image data can be stored in the received image memory 18a as the compression data until the decoding is actually required.

Upon reception of the both-side information, a front side of a physical page counter (1), a back side of the physical page counter (1), a front side of a physical page counter (2), a back side of the physical page counter (2), . . . a front side of a physical page counter (n), a back side of the physical page counter (n) are successively received. Upon reception, the error check is effected by FCS on the basis of ECM, and the decoding process is not performed. And, the decoding and recording of the received informations are effected in order of the back side of the physical page counter (1), the back side of the physical page counter (2), the front side of the physical page counter (1), the back side of the physical page counter (3), the front side of the physical page counter (2), . . . the front side of the physical page counter (n−2), the back side of the physical page counter (n), the front side of the physical page counter (n−1), and the front side of the physical page counter (n).

On the other hand, upon reception of the one-side information, the physical page counter (1), physical page counter (2), physical page counter (3), physical page counter (4), . . . , physical page counter (n−1) and physical page counter (n) are received. Upon reception, the error check is effected by FCS on the basis of ECM, and the decoding process is not performed. And, the decoding and recording of the received informations are effected in order of the physical page counter (2), physical page counter (4), physical page counter (1), physical page counter (6), physical page counter (3), . . . physical page counter (n−5), physical page counter (n), physical page counter (n−3), and physical page counter (n−1) (FIG. 12 shows a case where the received images are three pages (sheets)).

On the other hand, in the compulsory both-side recording of the one-side information, since the sides of the physical page counters are advanced one by one, as shown in FIG. 13, the attribution informations of front and back sides are allotted to the pages shown by the physical page counters in the received order, thereby handling the informations as if they are received in the both-side procedure, and the decoding and recording processes are effected in the same front/back side order as that in FIG. 12. Also in this case, the error check of the received data is performed by using the frame check sequence.

FIGS. 8 to 11 show a flow chart of a process for realizing the communication control. In FIGS. 8 to 11, the same reference numerals mean that the flow is continuous. The illustrated control procedure is stored in the ROM 24 as the program for the CPU 22.

Figure 8:
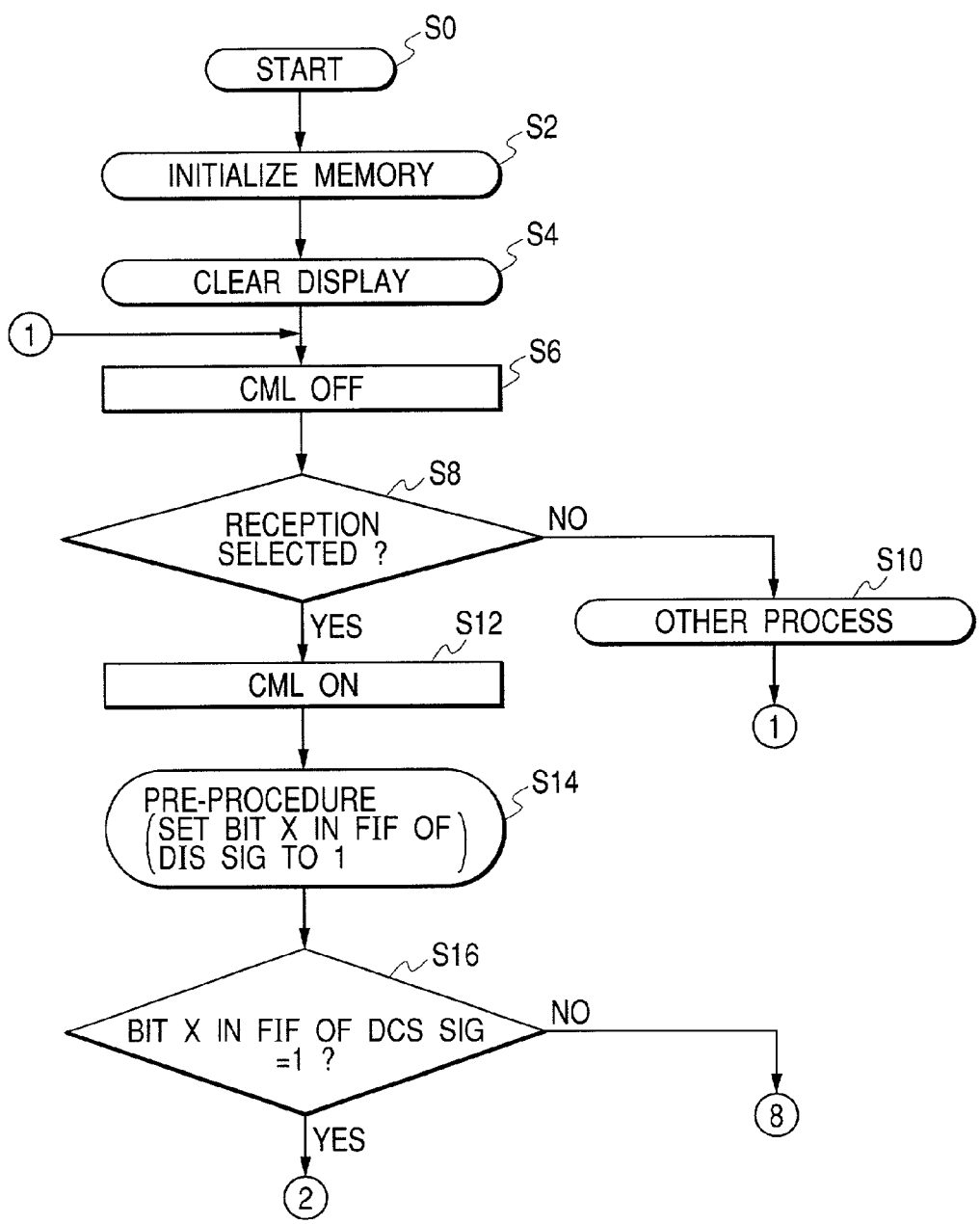
FIG. 8 is a flow chart showing communication control of a CPU 22 of FIG. 1.

In FIG. 8, a step S0 shows START of process started by a predetermined reset operation.

In a step S2, the memory circuit 18 is initialized via the bus 26, and, in a step S4, the display of the operation unit 20 is initialized (cleared) via the bus 26.

In a step S6, CML of the NCU 2 is turned OFF via the bus 26 and the line 2a is connected to the telephone set 4.

In a step S8, it is judged whether the facsimile reception is selected or not, and, if the facsimile reception is selected, the program goes to a step S12, where the CML of the NCU 2 is turned ON and the line 2a is connected to the facsimile apparatus (hybrid circuit 6). If the facsimile reception is not selected, the program goes to a step S10, where the other processes (original copying process, other memory registering process and the like) are carried out.

In a step S14, the facsimile communication pre-procedure is executed. Here, bit x of FIF of the DIS signal is set to 1 and the fact that the both-side reception in the alternate mode is possible is declared with respect to the transmitting station. Further, in the illustrated embodiment, in order to perform the error check by using the frame check sequence at the reception side, appropriate set-up is effected so that the frame check sequence information is transmitted by the transmitter (for example, the setting is effected by using the ECM mode).

Figure 11:
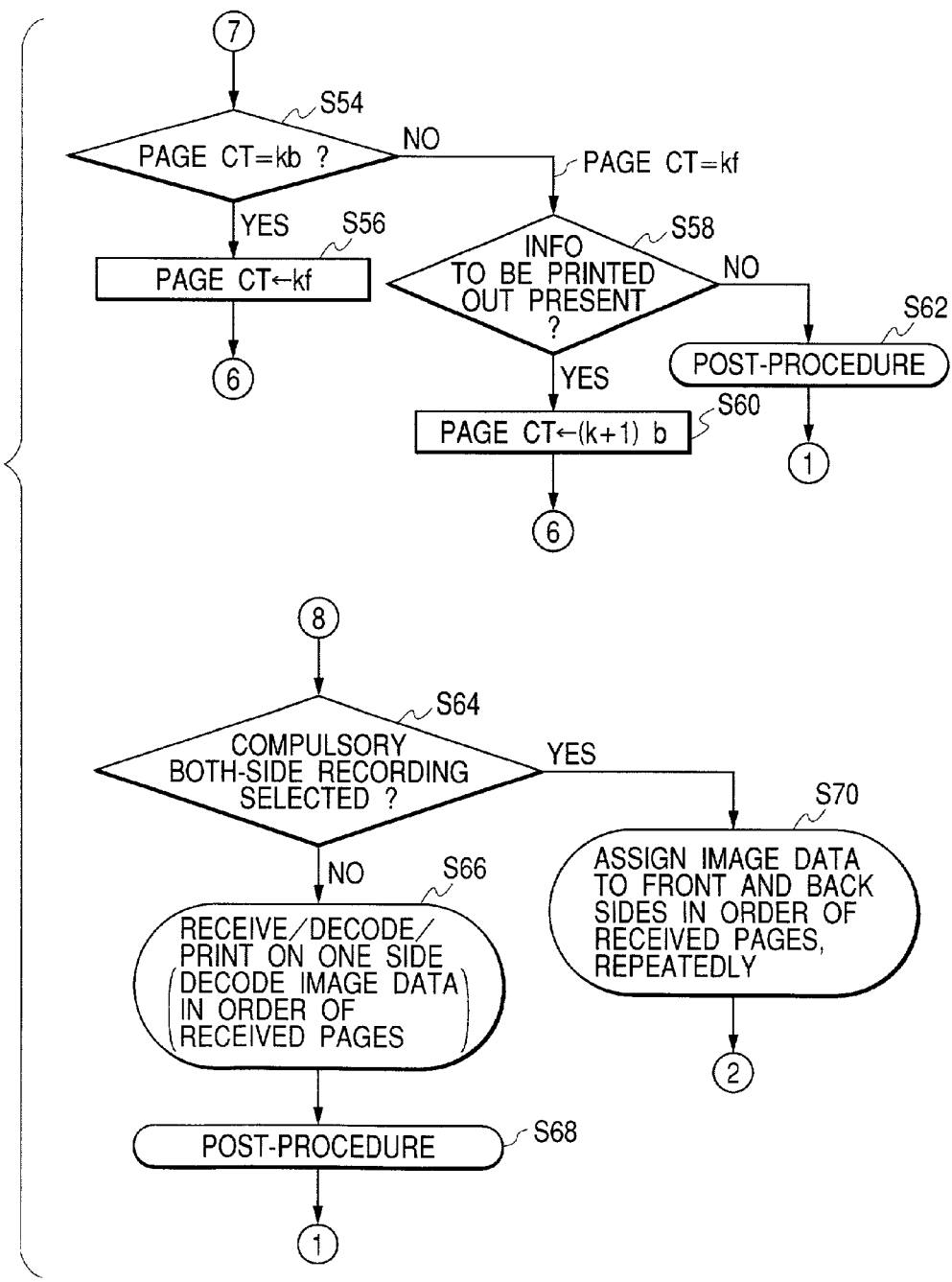
FIG. 11 is a flow chart showing communication control of a CPU 22 of FIG. 1.

In a step S16, it is judged whether bit x of FIF of the DCS signal of the transmitting station received in the facsimile communication pre-procedure is 1 or not, i.e., whether the both-side reception in the alternate mode is designated or not. In the step S16, if affirmative, the program goes to a step S18 (FIG. 9); whereas, if negative, the program goes to a step S64 (FIG. 11).

Figure 9:
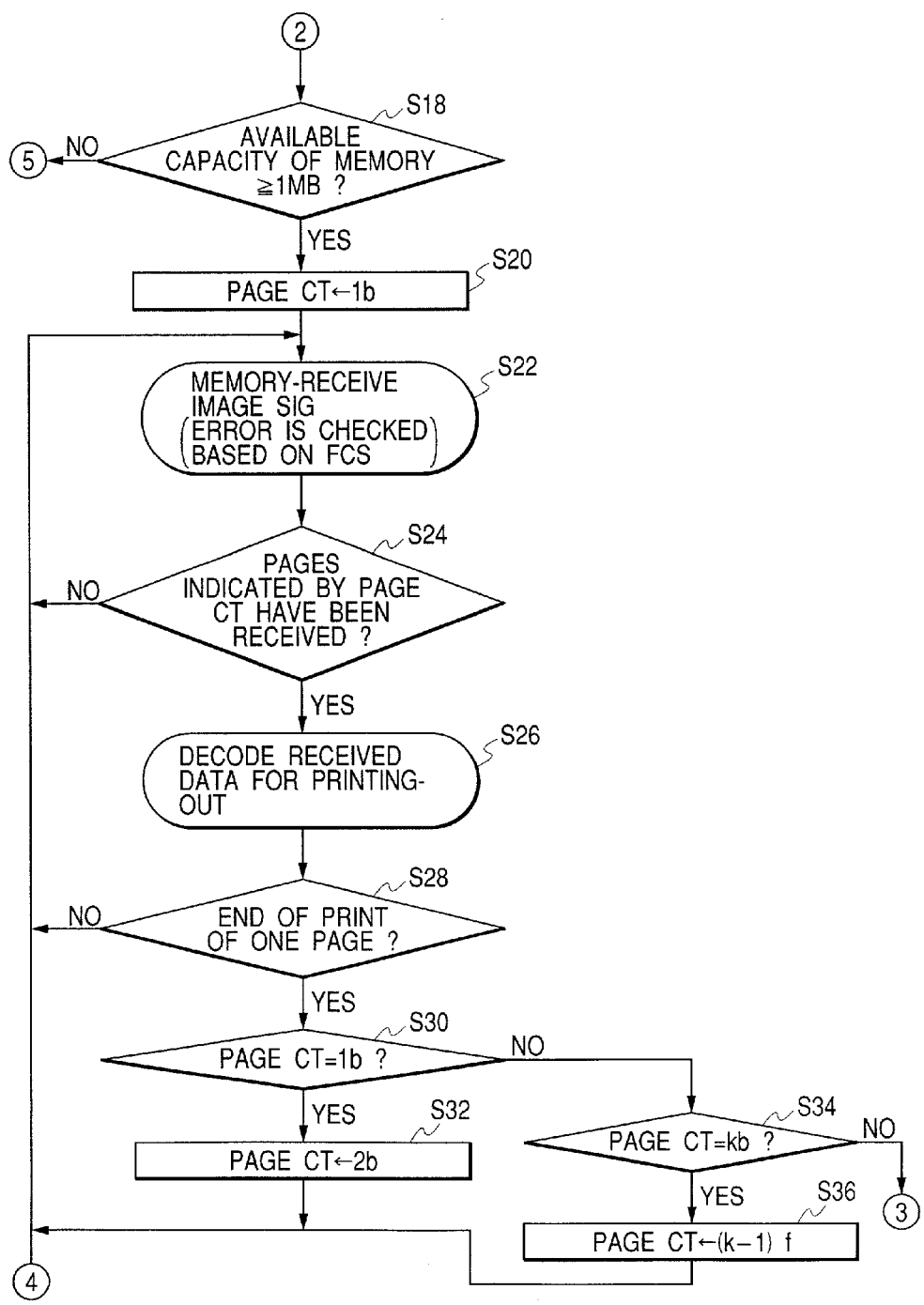
FIG. 9 is a flow chart showing communication control of a CPU 22 of FIG. 1.
Figure 10:
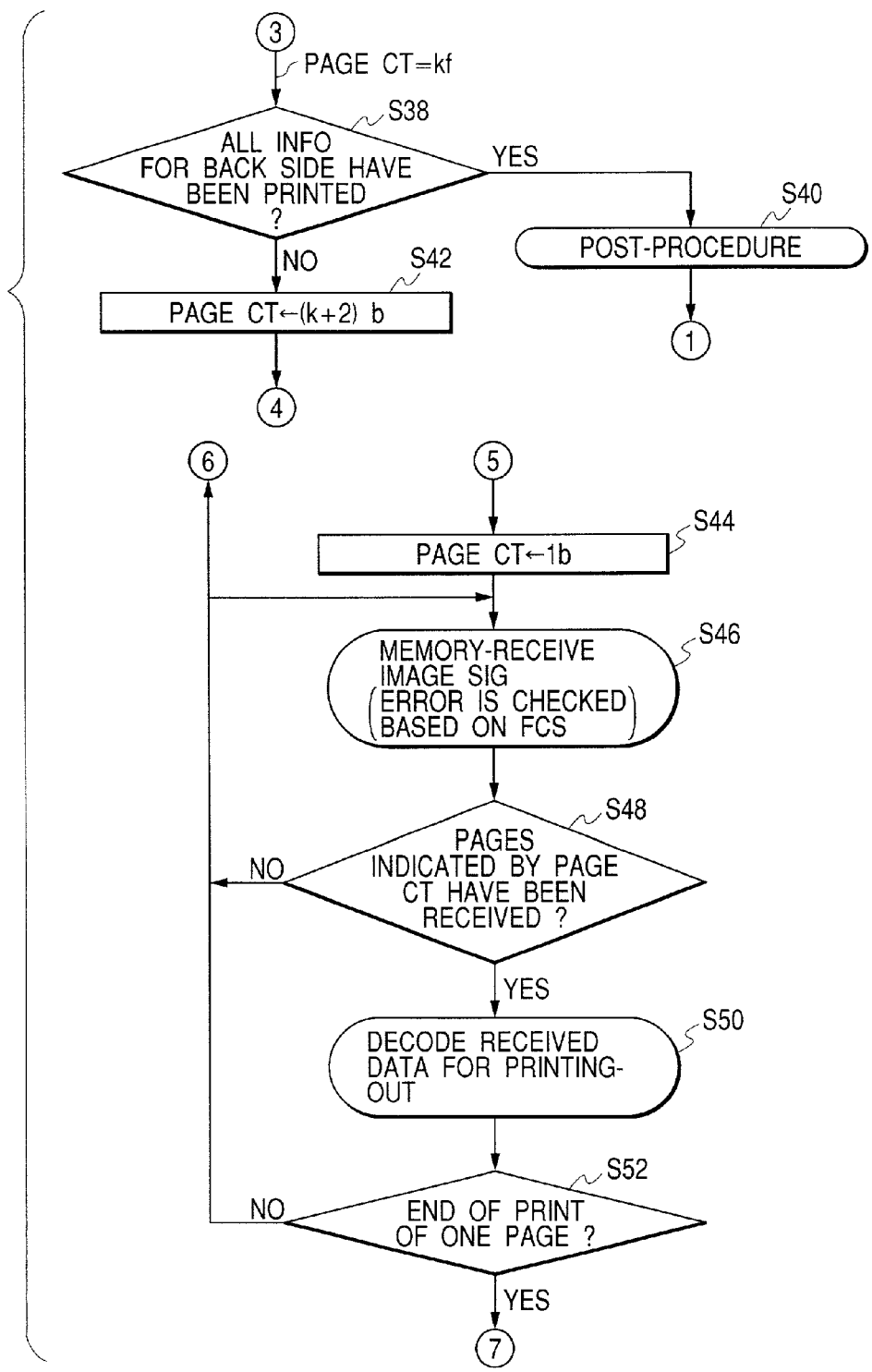
FIG. 10 is a flow chart showing communication control of a CPU 22 of FIG. 1.

In the step S18 (FIG. 9), it is judged whether the memory capacity of the work area 18b used in the decoding process in the memory circuit 18 is greater than 1 Mbyte. If affirmative, the program goes to a step S20; whereas, if negative, the program goes to a step S44 (FIG. 10). Here, while an example that it is judged whether the memory capacity of the work area 18b is greater than 1 Mbyte was explained, the present invention is not limited to such an example, but, a memory remaining amount of the received image memory 18a may be checked. Further, while it is judged whether the memory capacity was greater than 1 Mbyte, it may be judged whether there is memory capacity corresponding to four pages or more so that the recording can be effected in order of a back side of first memory recording paper, a back side of a second recording paper and a front side of the first recording paper. That is to say, if there are four pages or more, the program may go to the step S20; whereas, if negative, the program may go to the step S44. When the memory remaining amount is relatively great in this way, there is a merit that a recording method in which the printing speed of the printer can be made maximum during the recording can be adopted. On the other hand, even when the memory remaining amount is relatively small, although the printing speed of the printer cannot be made maximum in the both-side recording, by advancing the program to the step S44, the both-side recording can positively be executed and the waste use of the recording paper can be reduced.

In the step S20, a page counter (Page CT: corresponding to the physical page counter) is set to "1b". Here, "1" means the page number and "b" means a back side (back). Further, when the page counter (Page CT) is set to "2f", this means a front side (front) of a second page.

That is to say, since the page counter according to the illustrated embodiment stores informations regarding the page number (corresponds to "number of sheets" of the recording papers required for the recording since it corresponds to 1 "page" in 1 front/back set) and regarding the front and back sides. Of course, expression of the page number on the computer program and kneemonic representing the front and back sides are optional and, thus, they are not limited to the above.

In a step S22, memory-reception of the image signal is executed. The received image data is fief associated with the Q signal in case of both-side transferring and is stored in the received image memory 18a in a compressed condition. Here, transferring error check of the received image is effected by using the frame check sequence (FCS). If there is no communication error, error re-transferring is performed as much as possible. In this way, it is possible to prevent the error from occurring during the decoding and to save the memory capacity and CPU power by storing the compressed data in the memory.

In a step S24, it is judged whether reception of the page corresponding to the page counter (Page CT) is finished or not. In this step, if affirmative, the program goes to a step S26; whereas, if negative, the program is returned to the step S22 for effecting the memory receiving process.

Incidentally, after the program enters into a loop starting from the step S22, in the first step S24, since the page counter (Page CT) was firstly set to "1b" (i.e., back side of the first page) in the step S20, the program is returned to the step S22 for effecting the memory receiving process until the image of the back side of the first page is received in the both-side reception in the alternate mode. And, when the page counter becomes "1b" the program goes to a step S26. Similar to the above, the value of the page counter (Page CT) set in a step S32, S36 or S42 is used in this step S24.

When the program goes to the step S26, the received data corresponding to the page counter (Page CT) is decoded and is recorded by the recording circuit 16. The decoding process is effected by the CPU 22 (or other hardware circuit) by using the work area 18b, and the decoded bit map data is stored in the bit map memory 18c and is transferred to the recording circuit 16 therefrom.

Incidentally, in the step S26, if the decoding and recording of the page corresponding to the page counter (Page CT) have already been started, such processes are continued. The recording circuit 16 receives the decoded image data and performs the recording process while holding two recording papers in the recording paper reverse-rotating mechanism.

In a step S28, it is judged whether the recording of one-page is finished or not. In this step, if affirmative, the program goes to a step S30; whereas, if negative, the program is returned to the step S22 for effecting the receiving process.

In a step S30, it is judged whether the contents of the page counter (Page CT) is "1b" (back side of first page) or not. In this step, if affirmative, the program goes to a step S32, where the page counter (Page CT) is set to "2b" (back side of second page); whereas, if negative, the program goes to a step S34.

Incidentally, the processes in the steps S30 and S32 are processes for updating or renewing the value of the counter exceptionally required in the initial stage of the recording process in order to held two recording papers in the recording paper reverse-rotating mechanism of the recording circuit 16. The further counter updating process is determined by process in steps S34 and S36 or steps S38 and S42 which will be described later.

In the step S34, it is judged whether the contents of the page counter (Page CT) is "kb" (back side of k-th page) or not. In this step S34, if affirmative, the program goes to a step S36, where the page counter (Page CT) is set to "(k−1)f" (front side of (k−1)-th page); whereas, if negative, the contents of the page counter (Page CT) are "kf" (front side of k-th page), and, in this case, the program goes to a step S38 (FIG. 10).

In the step S38 (FIG. 10), it is judged whether record output of all back side informations is finished or not. In this step S38, if affirmative, the program goes to a step S40, where the facsimile post-procedure is executed. If negative in the step S38, the program goes to a step S42, where the page counter (Page CT) is set to "(k+2)b" (back side of (k+2)-th page) and then the program is returned to the step S22 (FIG. 9).

Incidentally, in this system, the front side of the last page is decoded and recorded, and, in this case, the program is passed through the step S36, and, and, after the recording is finished, the program goes to a step S40 for post-procedure through the steps S34 and S38.

By executing the processes in the steps S20 to S42, the reverse-rotating mechanism of the recording circuit 16 can be operated efficiently, and the performance of the printer can be made maximum even in the both-side recording. Further, since the read-out of the image data is controlled on the basis of Page Number (page number; 2 octets) and Page Information (page information) included in the Q signal, the control for making the performance of the printer maximum in the both-side recording can be realized very easily. In addition, since the data can be held in the received image memory 18a in the compressed condition until the decoding is required and since the decoded data is not required to wastefully be stored in the work area 18b unlike to the conventional techniques, the entire memory capacity required for the receiving process can be reduced greatly.

Incidentally, the reason why the page order for the decoding is changed to be different from the receiving order only when the capacity of the work area 18b capable of being used for the decoding process in the step S18 is not less than 1M byte is to reserve the memory required for the decoding.

Here, while an example that the reception of the image signal and the print-out of the image are effected in parallel was explained, the present invention is not limited to such an example, but, so long as the memory has margin, after images of all pages are received, print-out may be effected. By doing so, the both-side recording in which the performance of the printer is made maximum can be realized without being affected by the receiving speed for reception of the image and delay due to re-sending upon occurrence of error in the ECM communication.

That is to say, when the reception of all pages is finished, back side images from the back side "1b" of the first page to the back side "2b" are successively read out from the memory and are decoded. After the back side images up to "2b" are read out and decoded, the image of the front side "1f" of the first page is read out from the memory and is decoded and recorded. Then, the back side of the third page, front side of the second page, back side of the fourth page and front side of the third page are printed out. Then, similar operations can be continued until the last page is printed out.

On the other hand, in the step S18 (FIG. 9), it is judged that the memory capacity of the work area 18b capable of being used for the decoding process is below 1 Mbyte, in the step S44, the page counter (Page CT) is set to "1b" (back side of first page).

In a step S46, memory reception of the image signal is effected. The received image data is stored in the received image memory 18a in a compressed condition. Here, the transferring error check of the received signal is performed by using the frame check sequence (FCS), and, if there is the communication error, error re-sending is effected as much as possible.

In a step S48, it is judged whether reception of the page corresponding to the contents of the page counter (Page CT) is finished or not. If affirmative, the program goes to a step S50; whereas, if negative, the program is returned to the step S46.

In the step S50, the received data of the page corresponding to the contents of the page counter (Page CT) is decoded and is record-outputted by the recording circuit 16. Similar to the above, the decoding process is performed by using the work area 18b, and the decoded bit map data is stored in the bit map memory 18c and is transferred to the recording circuit 16 therefrom.

Incidentally, in the step S50, if the decoding and recording of the page corresponding to the page counter (Page CT) have already been started, such decoding and recording processes are continued.

In a step S52, it is judged whether the recording of one page is finished or not. In this step, if affirmative, the program goes to a step S54 (FIG. 11); whereas, if negative, the program is returned to the step S46.

In the step S54 (FIG. 11), it is judged whether the contents of the page counter (Page CT) are "kb" (back side of k-th page) or not. In this step S54, if affirmative, the program goes to a step S56, where the page counter (Page CT) is set to "kf" (front side of k-th page); whereas, if negative, the program goes to a step S58.

In the step S58, it is judged whether there is information which is not yet record-outputted. If there is the information which is not yet record-outputted, the program goes to a step S60, where the page counter (Page CT) is set to "(k+1)" (back side of (k+1)-th page). In the step S58, if negative, the program goes to a step S62, where the facsimile post-procedure is executed.

On the other hand, in the step S16 shown in FIG. 8, if the both-side reception in the alternate mode is not designated, in a step S64, operation information of the operation unit 20 (or set information stored in the predetermined memory area of the memory circuit 18 in accordance with predetermined operation) is inputted through the bus 26, and, it is judged whether compulsory both-side recording of the one-side received information is selected or not. If compulsory both-side recording of the one-side received information is selected, the program goes to a step S70, where page information is formed on the basis of the procedure signal whenever the image signal of one page is received, and attribution information regarding the front and back sides are allotted to the respective pages in the received page order (i.e., in order of front side, back side, front side, . . . ), thereby determining the page order for the decoding process, and then, the program is returned to the step S18 (FIG. 9). That is to say, in this case, the received informations are handled as if they are received in the both-side procedure. The attribution information regarding front and back sides of the pages are associated with the received data in an appropriate manner and then are stored in the predetermined management area of the memory 18 (refer to FIG. 13). By doing so, even when the normal one-side facsimile reception is effected, if the memory is adequate, there is provided a great merit that the performance of the printer in the both-side recording can be made maximum. Further, upon reception of the image, since the page information is formed on the basis of the procedure signal, and the attribution informations regarding the front and back sides are allotted to the respective pages in the received page order (i.e, in order of front side, back side, front side, . . . ), thereby determining the page order for the decoding process, the control for making the performance of the printer maximum in the both-side recording can be realized very easily.

Incidentally, here, while an example that the reception of the image signal and the print-out of the image are effected in parallel was explained, the present invention is not limited to such an example, but, so long as the memory has margin, after images of all pages are received, print-out may be effected. By doing so, the both-side recording in which the performance of the printer is made maximum can be realized without being affected by the receiving speed for reception of the image and delay due to re-sending upon occurrence of error in the ECM communication.

That is to say, when the reception of all pages is finished, back side images from the back side "1b" of the first page to the back side "2b" are successively read out from the memory and are decoded. After the back side images up to "2b" are read out and decoded, the image of the front side "1f" of the first page is read out from the memory and is decoded and recorded. Then, the back side of the third page, front side of the second page, back side of the fourth page and front side of the third page are printed out. Then, similar operations can be continued until the last page is printed out.

On the other hand, if the compulsory both-side recording of the one-side received information is not selected, the program goes to a step S66.

In the step S66, since the compulsory both-side recording of the one-side received information is not selected, receiving/decoding/recording (on one side of the recording paper) processes of the image signal are effected, and, in a step S68, the facsimile post-procedure is executed, and then, the program is returned to the step S6 (FIG. 8).

Now, another embodiment of a portion from the step S12 to the step S14 in FIG. 8 will be explained with reference to FIG. 15.

When the facsimile reception is selected, it is judged whether the memory capacity is greater than an amount corresponding to two pages or not (step S74), and the program is returned to the step S14 in FIG. 8, and, in the pre-procedure, bit x of FIF of the DIS signal is set to 1, thereby effecting both-side reception in the alternate mode.

On the other hand, if the memory capacity is not greater than the amount corresponding to two pages, in the pre-procedure, pre-procedure as the normal one-side reception is effected (step S78), and the program is jumped to the step S66.

As a result, even if the memory amount for recording the both-side is not adequate, since one-side reception can be effected, there is provided a great merit that the information can be transmitted positively.

Figure 16:
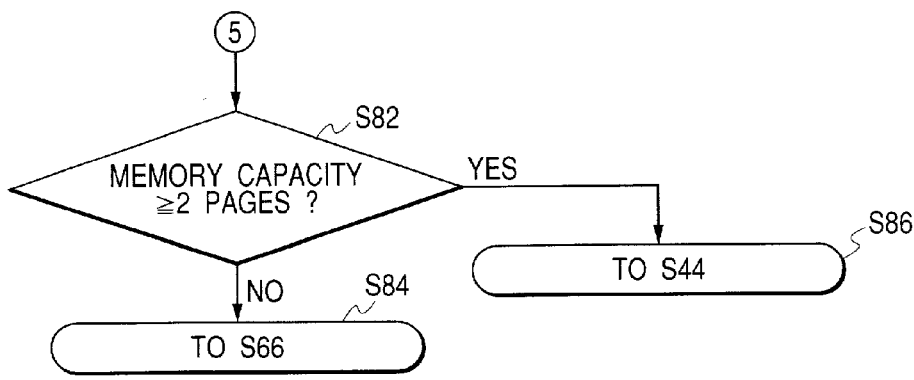
FIG. 16 is a view showing another embodiment of steps from (5) at a step S18 in FIG. 9 to a step S44 in FIG. 10.

Next, another embodiment of a portion from (5) at the step S18 in FIG. 9 to the step S44 in FIG. 10 will be explained with reference to FIG. 16.

If it is judged that the memory capacity usable in the step S18 is below 1 M byte, it is judged whether the memory capacity is greater than an amount corresponding to two page or not (step S82). If affirmative, the program is jumped to the step S44, where the both-side recording is executed. Thus, even when the memory remaining amount is relatively small, although the printing speed of the printer in the both-side recording cannot be made maximum, there is provided a merit that the both-side recording can be carried out positively and the waste use of the recording paper can be reduced. Further, the normal one-side facsimile reception is executed, and, even if the memory capacity is inadequate, there is provided a great merit that the both-side recording can be carried out positively and the waste use of the recording paper can be reduced. Further, even if the memory amount for recording the both-sides is not adequate, since one-sided reception can be effected, there is provided a great merit that the information can be transmitted positively.

Here, while the face-down discharging was explained, in face-up discharging, after the received image of all pages are stored in the memory and the information of the Q signal is associated with the image information, when predetermined number of sides from the last page are continuously read out from the memory and are recorded in order of back side of N-th page, back side of (N−1)-th page, front side of N-th page, back side of (N−2)-th page, front side of (N−1)th page and back side of (N−3)-th page, similar to the face-down discharge, the performance of the printer can be made maximum. In case of the face-up discharging, the reason why the printing is effected from the last page is to reserve the page order of the originals.

With the above-mentioned processes, according to the illustrated embodiment, when it is constructed so that the recording circuit 16 performs the both-side recording while maintaining the plural recording papers (for example, two papers) in the reverse-rotating mechanism and reverse-rotating the recording paper, if the capacity of the memory (work area 18b) capable of being used for the decoding process is greater than 1 Mbyte (or amount corresponding to four pages or more) (step S18), the decoding can be executed in order of back side of first page, back side of second page, front side of first page, back side of third page, front side of second page, back side of fourth page, . . . , back side of n-th page, front side of (n−1)-th page, (back side of (n+1)-th page . . . ). As a result, the printing speed of the printer can be made maximum. Further, since the control of the reading-out of the image data from the memory is effected on the basis of Page Number (page number: 2 octets) and Page Information (page information) included in the Q signal, there is provided a great merit that the control for making the performance of the printer maximum in the both-side recording can be realized very easily. Further, since the decoded data is not required to wastefully be stored in the bit map area 18c unlike to the conventional techniques and since the data can be held in the received image memory 18a in the compressed condition until the decoding is required, the entire memory capacity required for the receiving process can be reduced greatly. In addition, since the discharging order of the recording papers and discharging direction thereof can be properly controlled and the decoding order can be changed to align with the page order suitable for the recording control, efficiency of the recording process can be enhanced, and, since the data can smoothly been transferred from the bit map memory 18c to the recording circuit 16, using efficiency of the memory can also be enhanced.

Further, in the above-mentioned illustrated embodiment, when the both-side recording or the compulsory both-side recording is effected, if the memory (work area 18b) capacity capable of being used for accumulation of the received images is below 1 Mbyte (or amount corresponding to four pages or more) (step S18), the decoding is effected in order of back side of first page, front side of first page, . . . , back side of k-th page, front side of k-th page, . . . , back side of n-th page, and front side of n-th page. In case of this page order, although enhancement of through-put of the recording circuit 16 is not so expected as the enhancement of the through-put attained when the capacity of the memory (work area 18b) is greater than 1 Mbyte (or amount corresponding to four pages or more), there are provided merits that the both-side recording can be performed positively and that the waste use of the recording paper can be reduced. Further, in comparison with the conventional processing system in which the decoded front side data must be held in the bit map memory, the required memory capacity can be reduced greatly. In addition, the face-down output can be carried out by properly controlling the discharging order of the recording papers and discharging direction thereof.

Further, in the compulsory both-side reception mode, since the reading-out order of the image is determined after the attribution of front/back sides is determined in the receiving order of one-side informations received by one-side protocol, the control for making the performance of the printer in the both-side recording maximum can be realized very easily. Further, when the memory capacity is adequate, there is provided a great merit that the performance of the printer can be made maximum. Further, in the compulsory both-side reception mode, similar to the both-side recording, since the page processing order for the decoding is effected after the attribution of front/back sides is determined in the receiving order of one-side informations received by one-side protocol, also in the compulsory both-side recording mode, the required memory capacity can be reduced greatly. In addition, the face-down output can be carried out by properly controlling the discharging order of the recording papers and discharging direction thereof.

Further, in dependence upon the memory remaining amount, although it is not expected to achieve a recording system in which the printing speed of the printer is made maximum by effecting the recording in order of back side of first page, back side of second page, front side of first page, . . . and the maximum enhancement of through-put in which the recording is effected in order of back side of first page, front side of first page, . . . , back side of k-th page and front side of k-th page, there are provided a recording system in which the both-side recording can be performed positively and a recording system in which, if the memory amount for the both-side recording is insufficient, by effecting the one-side recording the information can be transmitted positively.

Further, by changing the recording system in accordance with the memory remaining amount in this way, since it is not required that the memory capacity for making the performance of the printer be always maintained, there is provided a great merit that the memory can be used for other applications (transmission and/or accumulation of printer data).

Further, since the reception error is checked by using the frame check sequence and the error re-sending is effected as much as possible if there is the communication error, the possibility that the recording is interrupted in such a manner that the operator is confused can be reduced. For example, when the decoding/recording orders for the pages are changed in the step S20 and so on, if the communication error occurs and the recording process is finished immediately, the output result in the vicinity of the last page will become meaningless record output result for the operator; however, by effecting the error resending, such possibility can be reduced.

In the above explanation, while the system exclusive to the facsimile apparatus was explained, the present invention is not limited to the system exclusive to the facsimile apparatus but can be applied to facsimile apparatus of other type. For example, the present invention can be applied to an arrangement in which facsimile MODEM is attached to or incorporated into a general-purpose terminal such as a personal computer and facsimile communication is effected under the control of software. In this case, the control program of the present invention can be stored in any computer-readable storing medium such a hard disc, a floppy disc, an optical disc, a photo-magnetic disc or a memory card and be supplied therefrom.

As apparent from the above explanation, according to a first aspect of the present invention, in a facsimile apparatus for receiving and decoding image data and effecting both-side record output, a method for controlling such a facsimile apparatus and a computer-readable storing medium storing a control program for such a facsimile apparatus, when the both-side recording is effected, by judging whether the memory remaining amount is greater than the predetermined amount, and, by reading out the images from the memory- and recording the images so as to record the other side of the recording medium after the predetermined number of front sides of the recording media are successively recorded if the memory remaining amount is greater than the predetermined amount, there is provided a great merit that the control for making the performance of the printer in the both-side recording can be realized very easily.

Further, according to a second aspect of the present invention, if the memory remaining amount is smaller than the predetermined amount, by reading out the images from the storing means and recording the images by the recording means so as to alternately record the front and back sides of the recording medium, although the printing speed of the printer in the both-side recording cannot be made maximum, there is provided a great merit that the both-side recording can be executed positively and the waste use of the recording medium can be reduced.

Further, according to a third aspect of the present invention, by judging whether a memory remaining amount is greater than a predetermined amount and by recording only one side of the recording medium if the memory remaining amount is below the predetermined amount, even then the memory amount for recording both sides is insufficient, there is provided a great merit that the information can be transmitted positively.

Further, according to a fourth aspect of the present invention, by adopting an arrangement in which it is judged whether a memory remaining amount is smaller than a first predetermined amount and smaller than a second predetermined amount smaller than the first predetermined amount, and, if the memory remaining amount is greater than the first predetermined amount, after the predetermined number of one sides of the recording media are recorded, the images are read out from the memory and are recorded so as to record the other sides of the recording media, and, if the memory remaining amount is greater than the second predetermined amount and smaller than the first predetermined amount, the images are read out from the memory and are recorded so as to alternately record the front and back sides of the recording medium, and, if the memory remaining amount is smaller than the second predetermined amounts, only one sides of the recording media are recorded, in dependence upon the memory remaining amount, although it is not expected to achieve a recording system in which the printing speed of the printer is made maximum by effecting the recording in order of back side of first page, back side of second page, front side of first page, . . . and the maximum enhancement of through-put in which the recording is effected in order of back side of first page, front side of first page, . . . back side of k-th page and front side of k-th page, there are provided a recording system in which the both-side recording can be performed positively and a recording system in which, if the memory amount for the both-side recording is insufficient, by effecting the one-side recording, the information can be transmitted positively.

What is claimed is:

1. A facsimile apparatus comprising:
receiving means for receiving image signals of plural pages for each page;
accumulating means for accumulating received images;
recording means for recording the received image signals on both sides of a recording paper by using a recording paper reverse-rotating mechanism; and
remaining amount judging means for judging whether or not a remaining amount of said accumulating means is greater than a predetermined amount,
wherein said recording means is operable to direct the recording paper to said recording paper reverse-rotating mechanism after one side of the recording paper is recorded and to record one side of another recording paper is recorded until the aforementioned recording paper is picked up and recorded in order to record the other side of the aforementioned recording paper; and
wherein when the remaining amount of said accumulating means is greater than the predetermined amount, the recording paper is directed to said recording paper reverse-rotating mechanism after the image is read out from said accumulating means and the one side of the recording paper is recorded, and one side of another recording paper is recorded until the aforementioned recording paper is picked up and recorded in order to record the other side of the aforementioned recording paper.

2. A facsimile apparatus according to claim 1, wherein when the remaining amount is smaller than the predetermined amount, the recording paper is directed to said recording paper reverse-rotating mechanism after the image is read out from said accumulating means and the one side of the recording paper is recorded, and the other side of the recording paper is recorded without recording one side of another recording paper until the aforementioned recording paper is picked up and recorded in order to record the other side of the aforementioned recording paper.

3. A facsimile apparatus according to claim 1, comprising memory remaining amount judging means for judging whether a memory remaining amount is greater than a predetermined amount, wherein when it is judged that the memory remaining amount is below the predetermined amount, only one side of the recording paper is recorded.

4. A facsimile apparatus according to claim 3, wherein said memory remaining amount judging means judges whether the memory remaining amount is smaller than a first predetermined amount and smaller than a second predetermined amount smaller than the first predetermined amount,
wherein when the memory remaining amount is greater than the first predetermined amount, the recording paper is directed to said recording paper reverse-rotating mechanism after the image is read out from said accumulating means and the one side of the recording paper is recorded, and one side of another recording paper is recorded until the aforementioned recording paper is picked up and recorded in order to record the other side of the aforementioned recording paper;
when the memory remaining amount is greater than the second predetermined amount and smaller than the first predetermined amount, the recording paper is directed to said recording paper reverse-rotating mechanism after the image is read out from said accumulating means and the one side of the recording paper is recorded, and the other side of the recording paper is recorded without recording one side of another recording paper until the aforementioned recording paper is picked up and recorded in order to record the other side of the aforementioned recording paper; and
when the memory remaining amount is smaller than the second predetermined amount, only one side of the recording paper is recorded.

5. A facsimile control method comprising the steps of:
receiving image signals of plural pages for each page;
accumulating received images;
recording the received image signals on both sides of a recording paper by using a recording paper reverse-rotating mechanism; and
judging whether or not a remaining amount in said accumulating step is greater than a predetermined amount,
wherein said recording step is operable to direct the recording paper to said recording paper reverse-rotating mechanism after one side of the recording paper is recorded and to record one side of another recording paper is recorded until the aforementioned recording paper is picked up and recorded in order to record the other side of the aforementioned recording paper, and
wherein when the remaining amount in said accumulating step is greater than the predetermined amount, the recording paper is directed to said recording paper reverse-rotating mechanism after the image accumulated in said accumulating step is read out and the one side of the recording paper is recorded, and one side of another recording paper is recorded until the aforementioned recording paper is picked up and recorded in order to record the other side of the aforementioned recording paper.

6. A method according to claim 5, wherein when the remaining amount is smaller than the predetermined amount, the recording paper is directed to said recording paper reverse-rotating mechanism after the image accumulated in said accumulating step is read out and the one side of the recording paper is recorded, and the other side of the recording paper is recorded without recording one side of another recording paper until the aforementioned recording paper is picked up and recorded in order to record the other side of the aforementioned recording paper.

7. A method according to claim 5, further comprising a step of judging whether a memory remaining amount is greater than a predetermined amount, wherein when it is judged that the memory remaining amount is below the predetermined amount, only one side of the recording paper is recorded.

8. A method according to claim 7, wherein said memory remaining amount judging step judges whether the memory remaining amount is smaller than a first predetermined amount and smaller than a second predetermined amount smaller than the first predetermined amount, and
wherein when the memory remaining amount is greater than the first predetermined amount, the recording paper is directed to said recording paper reverse-rotating mechanism after the image accumulated in said accumulating step is read out and the one side of the recording paper is recorded, and one side of another recording paper is recorded until the aforementioned recording paper is picked up and recorded in order to record the other side of the aforementioned recording paper;
when the memory remaining amount is greater than the second predetermined amount and smaller than the first predetermined amount, the recording paper is directed to said recording paper reverse-rotating mechanism after the image accumulated in said accumulating step is read out and the one side of the recording paper is recorded, and the other side of the recording paper is recorded without recording one side of another recording paper until the aforementioned recording paper is picked up and recorded in order to record the other side of the aforementioned recording paper; and when the memory remaining amount is smaller than the second predetermined amount, only one side of the recording paper is recorded.

9. A computer readable storage medium to store a computer program for the implementation of a facsimile control method comprising the steps of:

receiving image signals of plural pages for each page;

accumulating received images;

recording the received image signals on both sides of a recording paper by using a recording paper reverse-rotating mechanism; and judging whether or not a remaining amount in said accumulating step is greater than a predetermined amount, wherein said recording step is operable to direct the recording paper to said recording paper reverse-rotating mechanism after one side of the recording paper is recorded and to record one side of another recording paper is recorded until the aforementioned recording paper is picked up and recorded in order to record the other side of the aforementioned recording paper, and wherein when the remaining amount in said accumulating step is greater than the predetermined amount, the recording paper is directed to said recording paper reverse-rotating mechanism after the image accumulated in said accumulating step is read out and the one side of the recording paper is recorded, and one side of another recording paper is recorded until the aforementioned recording paper is picked up and recorded in order to record the other side of the aforementioned recording paper.

10. A computer readable storage medium according to claim 9, wherein when the remaining amount is smaller than the predetermined amount, the recording paper is directed to said recording paper reverse-rotating mechanism after the image accumulated in said accumulating step is read out and the one side of the recording paper is recorded, and the other side of the recording paper is recorded without recording one side of another recording paper until the aforementioned recording paper is picked up and recorded in order to record the other side of the aforementioned recording paper.

11. A computer readable storage medium according to claim 9, wherein said method, further comprising a step of judging whether a memory remaining amount is greater than a predetermined amount, wherein when it is judged that the memory remaining amount is below the predetermined amount, only one side of the recording paper is recorded.

12. A computer readable storage medium according to claim 11, wherein said memory remaining amount judging step judges whether the memory remaining amount is smaller than a first predetermined amount and smaller than a second predetermined amount smaller than the first predetermined amount, and wherein when the memory remaining amount is greater than the first predetermined amount, the recording paper is directed to said recording paper reverse-rotating mechanism after the image accumulated in said accumulating step is read out and the one side of the recording paper is recorded, and one side of another recording paper is recorded until the aforementioned recording paper is picked up and recorded in order to record the other side of the aforementioned recording paper;

when the memory remaining amount is greater than the second predetermined amount and smaller than the first predetermined amount, the recording paper is directed to said recording paper reverse-rotating mechanism after the image accumulated in said accumulating step is read out and the one side of the recording paper is recorded, and the other side of the recording paper is recorded without recording one side of another recording paper until the aforementioned recording paper is picked up and recorded in order to record the other side of the aforementioned recording paper; and when the memory remaining amount is smaller than the second predetermined amount, only one side of the recording paper is recorded.

* * * * *

UNITED STATES PATENT AND TRADEMARK OFFICE
CERTIFICATE OF CORRECTION

PATENT NO. : 6,982,805 B2
APPLICATION NO. : 10/020876
DATED : January 3, 2006
INVENTOR(S) : Takehiro Yoshida It is certified that error appears in the above-identified patent and that said Letters Patent is hereby corrected as shown below:

TITLE PAGE
[57] ABSTRACT

Line 8, "sides" should read --side--.
    Line 16, "sides" should read --side--.

SHEET 13

Figure 15:
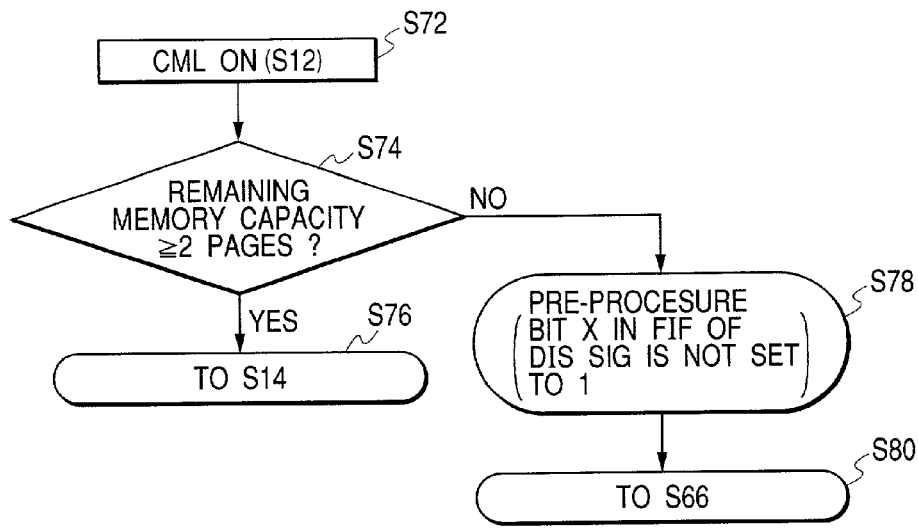
FIG. 15 is a view showing another embodiment of steps from a step S12 to a step S14 in FIG. 8.

Figure 15, "PRE-PROCESURE" should read --PRE-PROCEDURE--.

COLUMN 1

Line 39, "are" (second occurrence) should be deleted.
    Line 65, "is" should read --to--.

COLUMN 2

Line 24, "it-is" should read --it is--.

COLUMN 5

Line 59, "mode" should read --modes,--.

COLUMN 10

Line 61, "held" should read --hold--.

COLUMN 12

Line 34, ""(k+1)"" should read --"(k+1)b"--.

COLUMN 13

Line 59, "page" should read --pages--.

COLUMN 14

Line 8, "image" should read --images--.
    Line 52, "been" should read --be--.

UNITED STATES PATENT AND TRADEMARK OFFICE
CERTIFICATE OF CORRECTION

PATENT NO. : 6,982,805 B2
APPLICATION NO. : 10/020876
DATED : January 3, 2006
INVENTOR(S) : Takehiro Yoshida It is certified that error appears in the above-identified patent and that said Letters Patent is hereby corrected as shown below:

COLUMN 16

Line 48, "sides" should read --side--.
    Line 57, "sides" should read --side--.

COLUMN 17

Line 19, "is recorded" should be deleted.

COLUMN 18

Line 22, "is recorded" should be deleted.

COLUMN 17

Line 28, "is recorded" should be deleted.

Signed and Sealed this

First Day of August, 2006

JON W. DUDAS
*Director of the United States Patent and Trademark Office*